US011757854B2

(12) United States Patent
Jenkins et al.

(10) Patent No.: US 11,757,854 B2
(45) Date of Patent: *Sep. 12, 2023

(54) SECURE STREAM BUFFER ON NETWORK ATTACHED STORAGE

(71) Applicant: Western Digital Technologies, Inc., San Jose, CA (US)

(72) Inventors: Dean M. Jenkins, La Canada-Flintridge, CA (US); Robert P. Ryan, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,400

(22) Filed: Nov. 23, 2021

(65) Prior Publication Data

US 2022/0086130 A1 Mar. 17, 2022

Related U.S. Application Data

(63) Continuation of application No. 16/575,358, filed on Sep. 18, 2019, now Pat. No. 11,196,725, which is a continuation of application No. 15/954,359, filed on Apr. 16, 2018, now Pat. No. 10,447,667, which is a continuation of application No. 14/615,367, filed on Feb. 5, 2015, now Pat. No. 9,948,618.

(51) Int. Cl.
| | |
|---|---|
| *H04L 29/06* | (2006.01) |
| *H04L 9/40* | (2022.01) |
| *H04L 67/10* | (2022.01) |
| *H04L 65/612* | (2022.01) |
| *H04L 67/1097* | (2022.01) |

(52) U.S. Cl.
CPC ...... *H04L 63/0457* (2013.01); *H04L 63/0428* (2013.01); *H04L 63/205* (2013.01); *H04L 65/612* (2022.05); *H04L 67/10* (2013.01); *H04L 67/1097* (2013.01)

(58) Field of Classification Search
CPC ............. H04L 63/0457; H04L 63/0428; H04L 63/205; H04L 65/4084; H04L 67/10; H04L 67/1097
See application file for complete search history.

(56) References Cited

U.S. PATENT DOCUMENTS 9,948,618 B2 * 4/2018 Jenkins ............... H04L 67/1097
10,447,667 B2 * 10/2019 Jenkins ................ H04L 63/205
(Continued)

OTHER PUBLICATIONS

Attorneys for Defendant Viasat, Inc., Viasat, Inc.'s Invalidity Contentions, United States District Court Northern District of California Oakland Division, Case No. 4:22-cv-4376-HSG.
(Continued)

*Primary Examiner* — Baotran N To

(57) ABSTRACT

A network attached storage device coupled to a local network and including a network interface configured to receive digital content from a remote content provider outside the local network. The network attached storage device includes storage having a first region accessible by a user of the local network and a secure region. The network attached storage device includes a processor coupled to the storage, the processor configured to control access to the secure region of the storage based on instructions received from a remote content provider.

20 Claims, 8 Drawing Sheets

(56) References Cited

U.S. PATENT DOCUMENTS

| | | | |
|---|---|---|---|
| 11,196,725 B2* | 12/2021 | Jenkins | H04L 63/205 |
| 2012/0227066 A1* | 9/2012 | Woxblom | H04L 63/10 |
| | | | 725/25 |
| 2012/0315017 A1* | 12/2012 | Matsushita | G11B 20/00862 |
| | | | 386/E5.064 |
| 2013/0268771 A1* | 10/2013 | Blankenbeckler | G06F 21/10 |
| | | | 713/189 |
| 2014/0195805 A1* | 7/2014 | Koo | H04L 63/083 |
| | | | 713/168 |

OTHER PUBLICATIONS

Attorneys for Defendant Viasat, Inc., Exhibit 400-1: Rae (U.S. Pat. No. 8,600,062), Viasat, Inc.'s Invalidity Contentions, United States District Court Northern District of California Oakland Division, Case No. 4:22-cv-4376-HSG.

Attorneys for Defendant Viasat, Inc., Exhibit 667-1: Smith 186 (U.S. Pat. No. 20150281186), Viasat, Inc.'s Invalidity Contentions, United States District Court Northern District of California Oakland Division, Case No. 4:22-cv-4376-HSG.

Attorneys for Defendant Viasat, Inc., Exhibit 834-1: Pestoni (US 2013/0121489 A1), Viasat, Inc.'s Invalidity Contentions, United States District Court Northern District of California Oakland Division, Case No. 4:22-cv-4376-HSG.

* cited by examiner

SECURE STREAM BUFFER ON NETWORK ATTACHED STORAGE

CROSS-REFERENCE TO RELATED APPLICATIONS

The present application is a continuation of U.S. patent application Ser. No. 16/575,358, filed on Sep. 18, 2019, entitled SECURE STREAM BUFFER ON NETWORK ATTACHED STORAGE, which is a continuation of U.S. Pat. No. 10,447,667, filed on Apr. 16, 2018, entitled SECURE STREAM BUFFER ON NETWORK ATTACHED STORAGE, which is a continuation of U.S. Pat. No. 9,948,618, filed on Feb. 5, 2015, entitled SECURE STREAM BUFFER ON NETWORK ATTACHED STORAGE, the disclosures of which are hereby incorporated by reference in their entireties.

BACKGROUND

Network providers are continually attempting to increase their revenue. One method of generating revenue is to control the transmission of streaming data on their network, sometimes called "throttling." Bandwidth throttling includes the intentional slowing of internet service by an Internet Service Provider (ISP). It can be employed in communication networks in an attempt to regulate network traffic and minimize bandwidth congestion. Throttling may include limiting a user's upload and download rates on programs such as video streaming. Throttling the data transmission in a stream environment may cause deterioration in a display of the received transmission. For example, throttling may cause the end display to hic-up or stall while waiting for the next packet. Network operators are currently receiving payment from content streamers, Netflix®, Hulu®, etc., in exchange for guaranteed Quality of Service (QoS).

Display devices often have very limited display buffers. Such limited display buffers keep the cost of the display low. Limited buffer size also limits content from being misappropriated from the buffer. Streaming content providers prefer to stream the content to the user in order to maintain control over the content, e.g., by controlling the client to which the content is being transmitted and how much content is transmitted at a time.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of buffering streaming content using a secure portion of a network attached storage will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as software or hardware depends upon the particular application and design constraints imposed on the overall system.

Network streaming of media content such as movies and televisions shows, among other types of content, has become commonplace. At times, network providers, such as ISPs limit or throttle certain streaming hosts, for example, to extract financial gains for providing Quality of Service (QoS).

Aspects presented herein provide a way to maintain smaller sizes of buffers on display device and to maintain control over content while ensuring that content can be viewed without deterioration due to throttling through the use of a Network Attached Storage (NAS) device having a secure portion for buffering streaming content. Such a NAS device may be used, e.g., as part of a home network to provide for private buffering of streaming content for any number of display devices.

As most display devices have very limited buffering capability, such buffering at a NAS device may help to ensure QoS at the display device.

Additionally, by buffering the media at the NAS device, the media content can be viewed without the hiccups or stalling due to throttling, because the content is already buffered and can be viewed without being streamed over the Internet.

Control of the media may be maintained by the stream content provider through the security employed by the secure portion of the storage device. This portion may be secured, e.g., by designating the media as private. Access to the private buffer may be sold on a subscription model to streaming content providers.

Additionally, individual display devices do not require additional buffering capability thereby avoiding an increase in cost for the devices that would be involved in increasing the size of their buffers.

Figure 1:
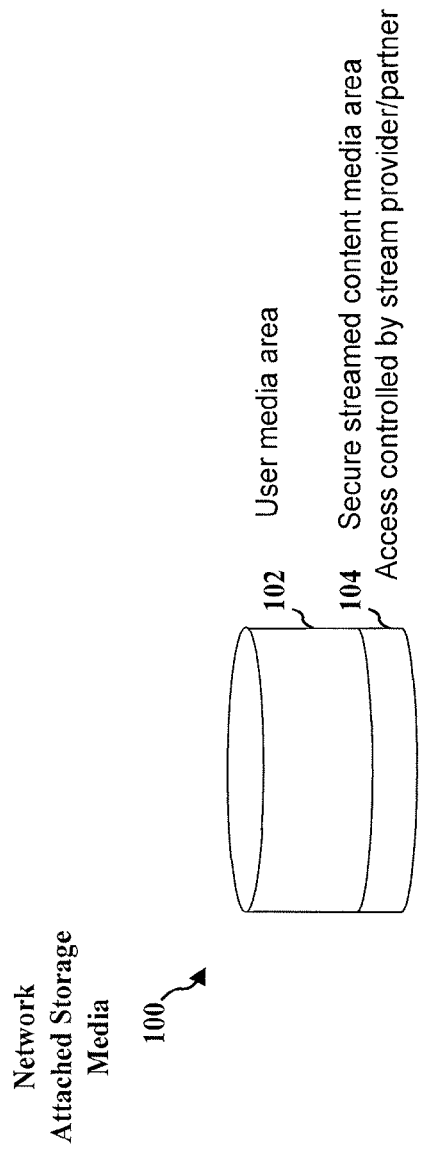
FIG. 1 is a diagram illustrating aspects of an example Network Attached Storage device having a secure region.

FIG. 1 illustrates an example embodiment of an NAS device 100 having a secure portion controlled by a remote content provider as a buffer for digital content. Among others, a content provider may include a media streamer that streams media such as movies, televisions shows, etc. to a user, such as Netflix®, Hulu®, Vude®, Amazon®, or iTunes®. A NAS device may comprise one or more storage devices, a network interface, and one or more processors, as described in more detail in connection with FIG. 3. The one or more storage devices may include any of a hard disk drive (HDD), a solid state drive (SSD), a solid state hybrid drive, etc. The storage may comprise, for example, magnetic non-volatile storage, solid state non-volatile storage or hybrid forms of magnetic and solid state storage. The storage may be configured, for example, as a Redundant Array of Inexpensive Disks (RAID).

For example, the network interface of the NAS device 100 may be configured to enable the NAS device 100 to access, among others, Ethernet, the Internet, a Local Area Network (LAN), a Wide Area Network (WAN), Wi-Fi a cloud computing environment, a remote NAS device, a network share, a personal computer and/or a tablet. The NAS device 100 may also couple to a USB-connected device, such as a USB storage device. The NAS device 100 may also be configured to access any other external devices and/or services directly (e.g., locally) or indirectly coupled thereto. The NAS device 100 may also be configured to couple to any externally accessible storage device, for example, an ESATA device, a Thunderbolt device, a FireWire device or any secondary storage device that is accessible to the NAS device 100.

The NAS device 100 includes a user media area 102 that may be accessible by a user of the local network. The device 100 includes a secure region 104, e.g., a secure content media area, for which access may be controlled by the remote content provider. For example, the secure region may be a non-user accessible area on a hard drive, SSD, or other data storage device. Thus, access to the secure region of the storage for the NAS device may be controlled based on instructions received from a remote content provider outside of the local network.

The secure region may be used, e.g., to store a streamed movie or television show, among other types of received content.

The secure region may be inaccessible by the user without permission from the content provider. The secure region may be hidden from the user. This allows the content provider to continue to maintain control of the media content even once it has been pushed to the NAS device, e.g., in a user's home.

Digital content may be stored in the secure region 104 using encryption that secures the streamed content to the secure region 104 of the NAS. For example, a type of Digital Rights Management (DRM) encryption may be employed to store the digital content in the secure region 104. Among other types of DRM encryption that may be used, one example of DRM encryption that may be employed is Secure Content Storage Association (SCSA) type encryption. Such encryption may secure the digital content to the drive of the secure region and require keys in order to access the content.

The NAS device may configured so that the amount of data stored at the secure region and/or the type of encryption used to store streamed content in the secure region 104 may be controlled by the stream content provider.

Figure 2:
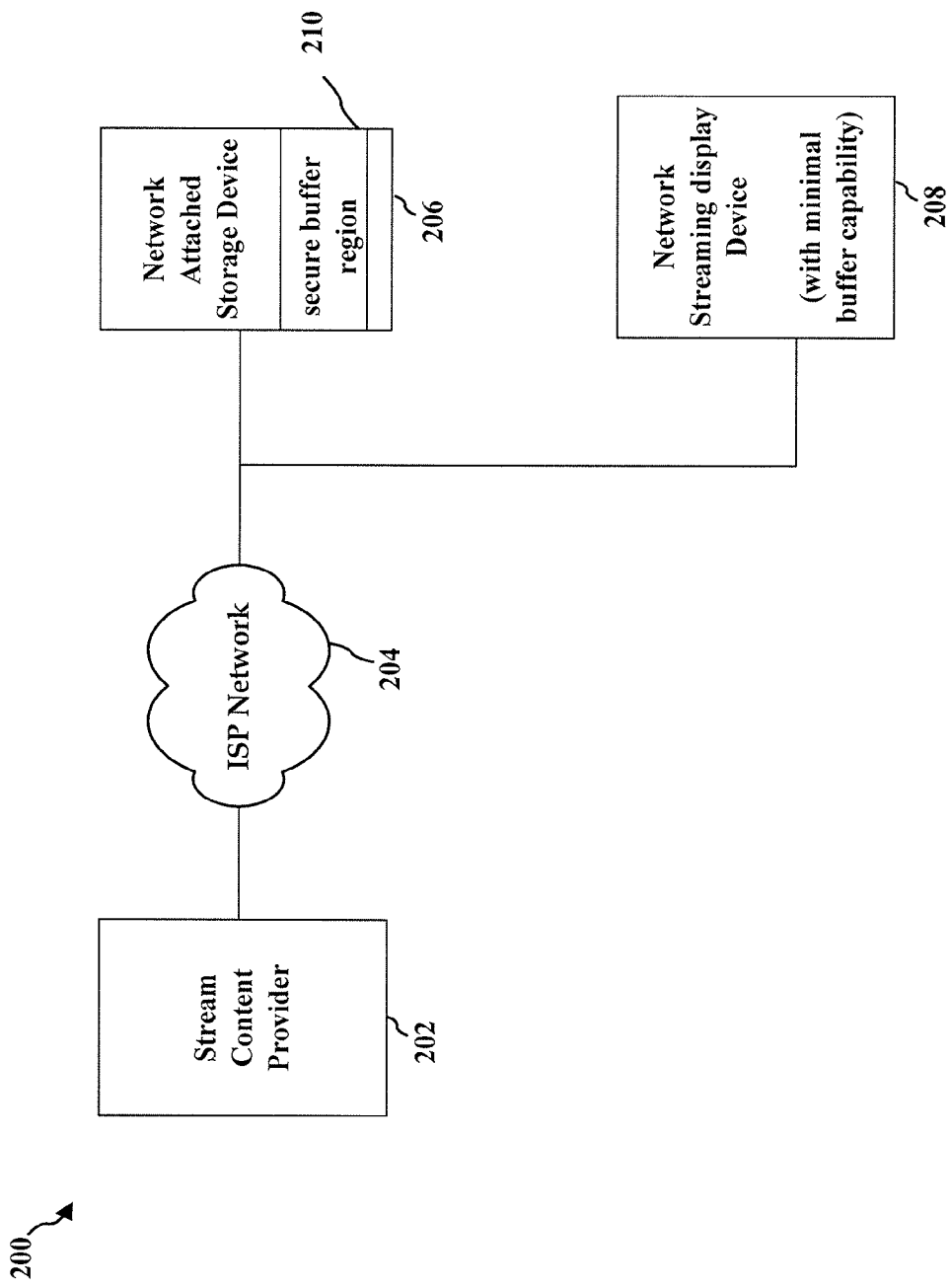
FIG. 2 is a diagram illustrating aspects of a Network Attached Storage device connected to a stream content provider.

FIG. 2 illustrates a computer system 200 including an NAS device 206 coupled to a local network. The NAS device 206 is configured to connect to a remote content provider 202 outside of the local network via ISP network 204 in order to receive streamed content from the stream content provider 202. Among others, a content provider may include a media streamer that streams media such as movies, televisions shows, etc. to a user, such as Netflix®, Hulu®, Vudu®, Amazon®, or iTunes®. NAS device 206 includes a secure buffer region 210. Secure buffer region comprises at least a portion of the storage at NAS device 206. NAS device 206 may also be connected via the local network to any number of display devices 208, such as smart TVs, tablets, mobile phones, personal computers, media streaming devices and/or the like.

Figure 3:
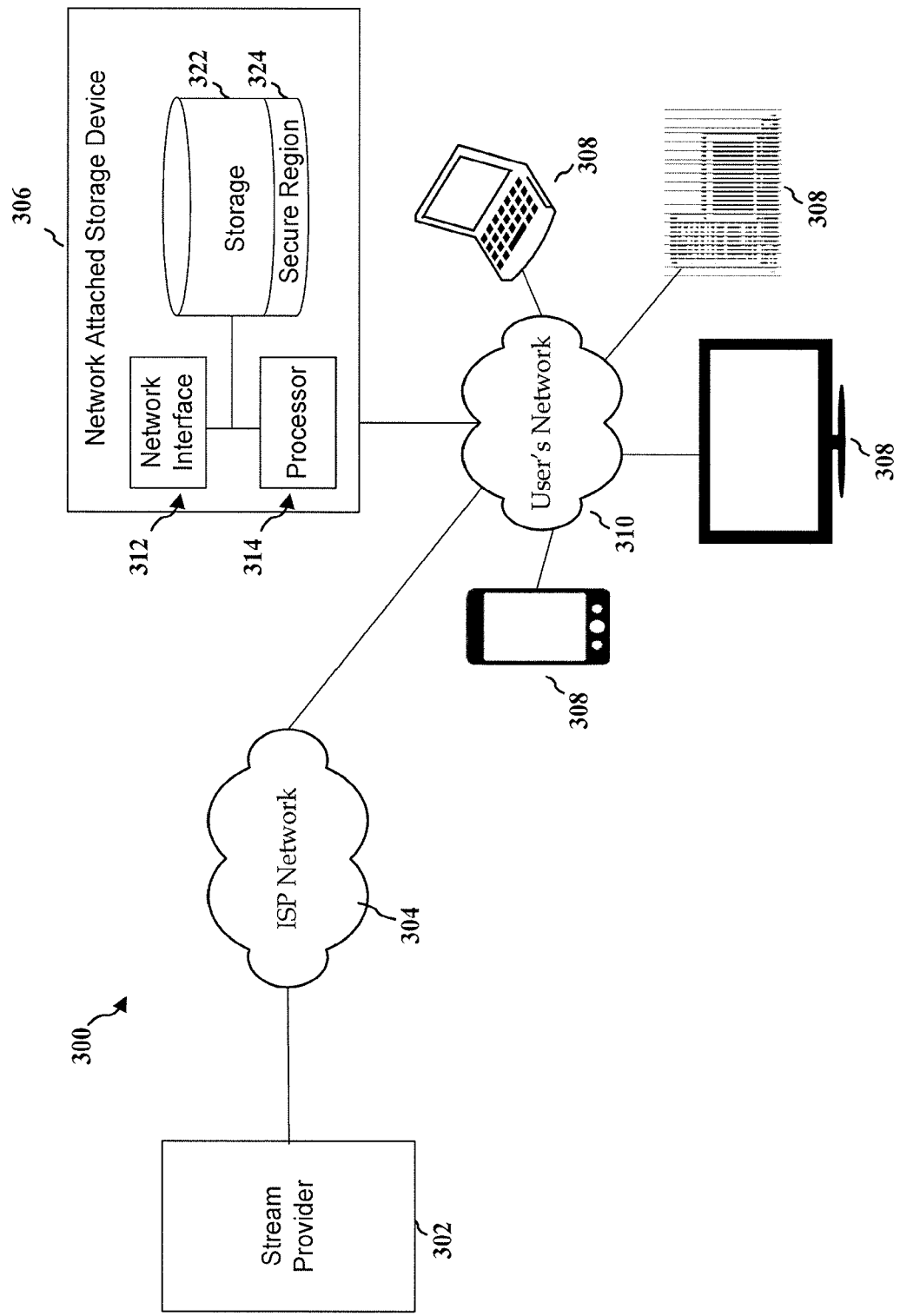
FIG. 3 is a diagram illustrating aspects of a Network Attached Storage device connected to a stream content provider.

FIG. 3 illustrates an example system 300 in which NAS device 306 is coupled to multiple display devices 308 via local network 310, such as a user's home network.

The secure memory region 210 of NAS device 206 may be configured as a buffer for receiving steaming content for the at least one display device 208 in a manner controlled by the stream content provider 202. Display devices 208 may have minimal buffer storage for a number of reasons. For example, the cost of the display device may be reduced by requiring a smaller amount of buffer storage in the display device. Additionally, content providers may prefer smaller buffers in display devices because this allows them to maintain control of their content by providing smaller amounts at a time to the display device.

By providing a larger buffer in the secure region of the NAS device 206, 306 that can be used by the display device enables the content provider 202, 302 to use burst transmission to stream the content in larger bursts than might be possible for transmissions to a smaller buffer. Also, as the streamed content continues to be controlled by the stream content provider, the stream content provider can use burst transmission without risking misappropriation of the streamed content by the user.

For example, once a user requests content from a stream content provider via a display device 208, the NAS device 206 may negotiate with the stream content provider 202 to receive the desired content and to buffer an encrypted stream of the content in the secure region 210. Such negotiation may include, e.g., informing the stream content provider of a secure region within the NAS device that is not accessible by a user. The NAS device may inform the stream content provider of the available size of the secure region or may negotiate with the stream content provider to agree on a size of a secure buffer. Among other negotiated aspects, the NAS device may negotiate with the stream content provider to agree on a length of time for which the content will be retained at the secure region of the NAS device, requirements for the user to access the streamed content, whether the streamed data is encrypted, and keys for accessing encrypted content. For example, requirements for accessing the streamed content may be time based, user based, etc. If the streamed content is encrypted, a decryption key may also be obtained. The keys may be obtained based on a payment, a license server, etc. The NAS device 206 may then present the streamed content from the secure region to the display device 208 as encrypted content.

As illustrated in FIG. 3, the NAS device may comprise a network interface 312 configured to couple the NAS device 306 to access one or more networks, such as the user's network 310 and/or the ISP network 304. This network interface may enable the NAS device 306 to be accessed by a display device 308 and to enable the NAS device 306 to access remote content providers 302 outside the user's network, e.g., via ISP 304. For example, the network interface of the NAS device 100 may be configured to enable the NAS device 100 to access, among others, Ethernet, the Internet, a Local Area Network (LAN), a Wide Area Network (WAN), Wi-Fi a cloud computing environment, a remote NAS device, a network share, a personal computer and/or a tablet. The network interface may enable communications according to the Standards of the Institute of Electrical and Electronic Engineering (IEEE), Standards 802.11. The NAS device 100 may also couple to a USB-connected device, such as a USB storage device. The NAS device 100 may also be configured to access any other external devices and/or services directly (e.g., locally) or indirectly coupled thereto. The NAS device 100 may also be configured to couple to any externally accessible storage device, for example, an ESATA device, a Thunderbolt device, a FireWire device or any secondary storage device that is accessible to the NAS device 100.

NAS device 306 may further comprise a processor 314 configured to control storage of content in the secure region 324 and to control access to the secure region 324 of the storage based on instructions received from a remote content provider, in addition to control of user accessible storage 322.

Figures 4A, 4B:
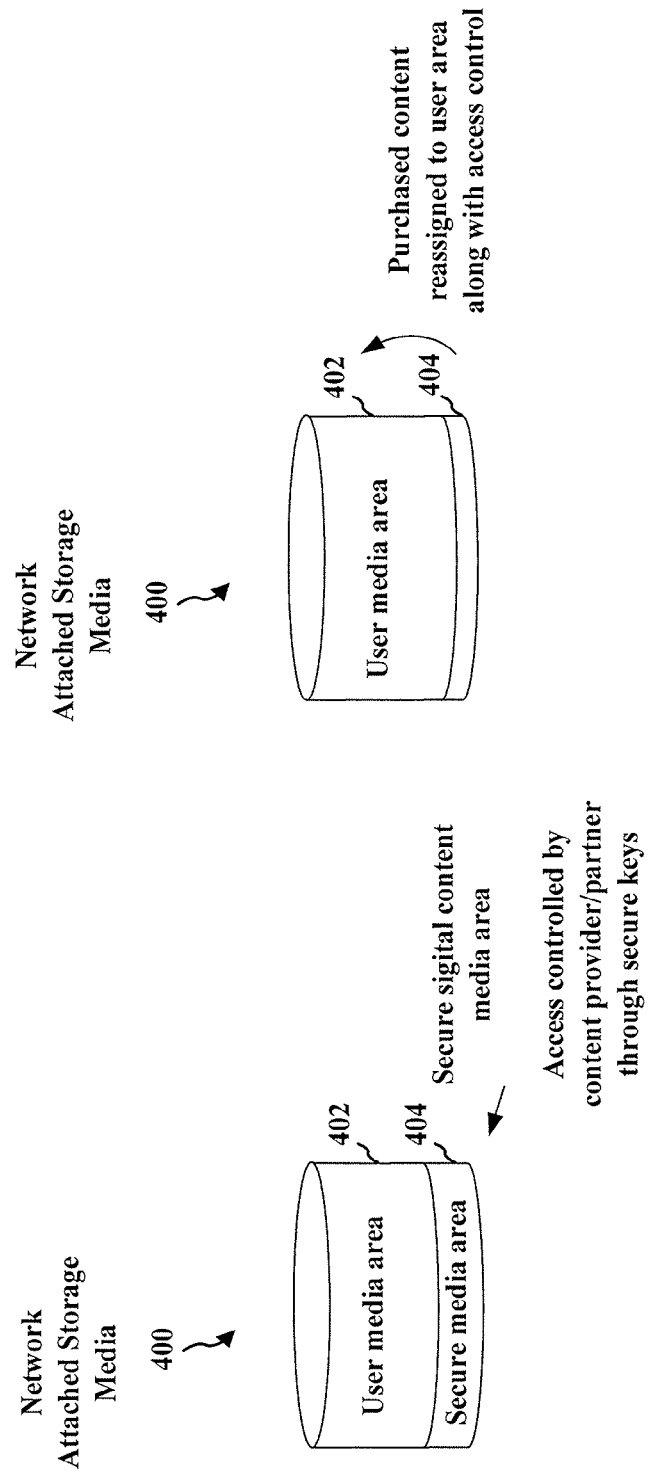
FIGS. 4A and 4B are diagrams of a Network Attached Storage device providing user access to purchased content.

FIGS. 4A and 4B illustrate an example, in which previously buffered content can be purchased by the user and reassigned to the user accessible region 402 of the NAS device. Among other times, an opportunity to purchase the content may be presented to the user after the content has been viewed. For example, as illustrated in FIG. 4A, the NAS device 400 may include a user accessible media area 402 and a secure region 404. Streamed content in secure region 404 may be inaccessible to the user and may instead be controlled by a stream content provider.

In one example, the NAS device 400 may be configured to move a received digital object stored in the secure region 404 to the first region, e.g., 402 along with keys for accessing the digital object based on instructions from the remote content provider, as illustrated in FIG. 4B. The digital object secured by the remote content provider may be moved to the user accessible area 402 along with the appropriate keys for their account. The account may be, among other types of accounts providing DRM, an SCSA account.

In another example, the NAS device may be configured to reallocate a portion of the secure region storing a streamed object to the first region based on instructions from the remote content provider. For example, the digital object may be stored in a Shingled Magnetic Recording (SMR) zone, where the zone itself is protected and the entire zone is re-allocated to the user area when content is purchased. An unused portion of the user accessible region 402 can be designated to replace the portion of the secure region 404 that is re-allocated to the user area 402.

In one aspect, NAS device my use Virtual Private Network (VPN) encryption to receive the streaming content. The addition of VPN encryption on the NAS may help to avoid throttling on the stream, because it may avoid detection of the stream, e.g., by the ISP. As the ISP does not detect the destination, ISP selective throttling may be avoided. Additionally, the use of VPN encryption further secures the digital content.

Display devices may have their application software altered to "look" for a secure host, e.g., a NAS device having a secure region, within the home network prior to making a connection to the host provider, e.g., stream content provider. This information can then be sent from the display device to the stream provider to allow the content provider to make use of the secure network storage. Thus, the content provider may be informed of the presence of a NAS device having a secure region that can be used as a secure buffer for a display device that is requesting streaming content. The stream provider may also discover a secure stream buffer on network attached storage in other ways.

The secure region of the NAS device may be managed, e.g., between an NAS device application, DRM controls and the remote content provider. For example, display devices may go to the NAS device for content. The NAS device may then negotiate with the content provider for the digital content. The content may be preloaded and buffered using a desired encrypted stream, as specified by the content provider, across the ISP network to the secure area in the NAS device. The stream data may then be presented from the secure area of the NAS device as standard encrypted content to the display device.

Remote content providers can pre-load the secure region of the NAS device without opening themselves up to misappropriation of the content, because they continue to control the secure portion of the in-home media storage, and therefore, control access to the media after it is stored at the NAS device. Thus, the remote content providers can stream, or push, content to users at selected times that are beneficial for the stream content provider. This allows the content provider to transmit the content at appropriate times, e.g., to stage the desired content in the home network. This may lower the cost of such streaming, because the time of the streaming may be selected to be beneficial to the content provider. For example, times of lower network usage, or for which QoS costs are reduced may be selected for streaming the content to the user. Pre-loading the secure portion of the NAS device may allow for the content provider to extent storage to the edge of the network at relatively low cost per unit per month. A simple user queue or a user profile may be used by the content provider to determine the content to pre-store in the secure buffer.

Figure 5:
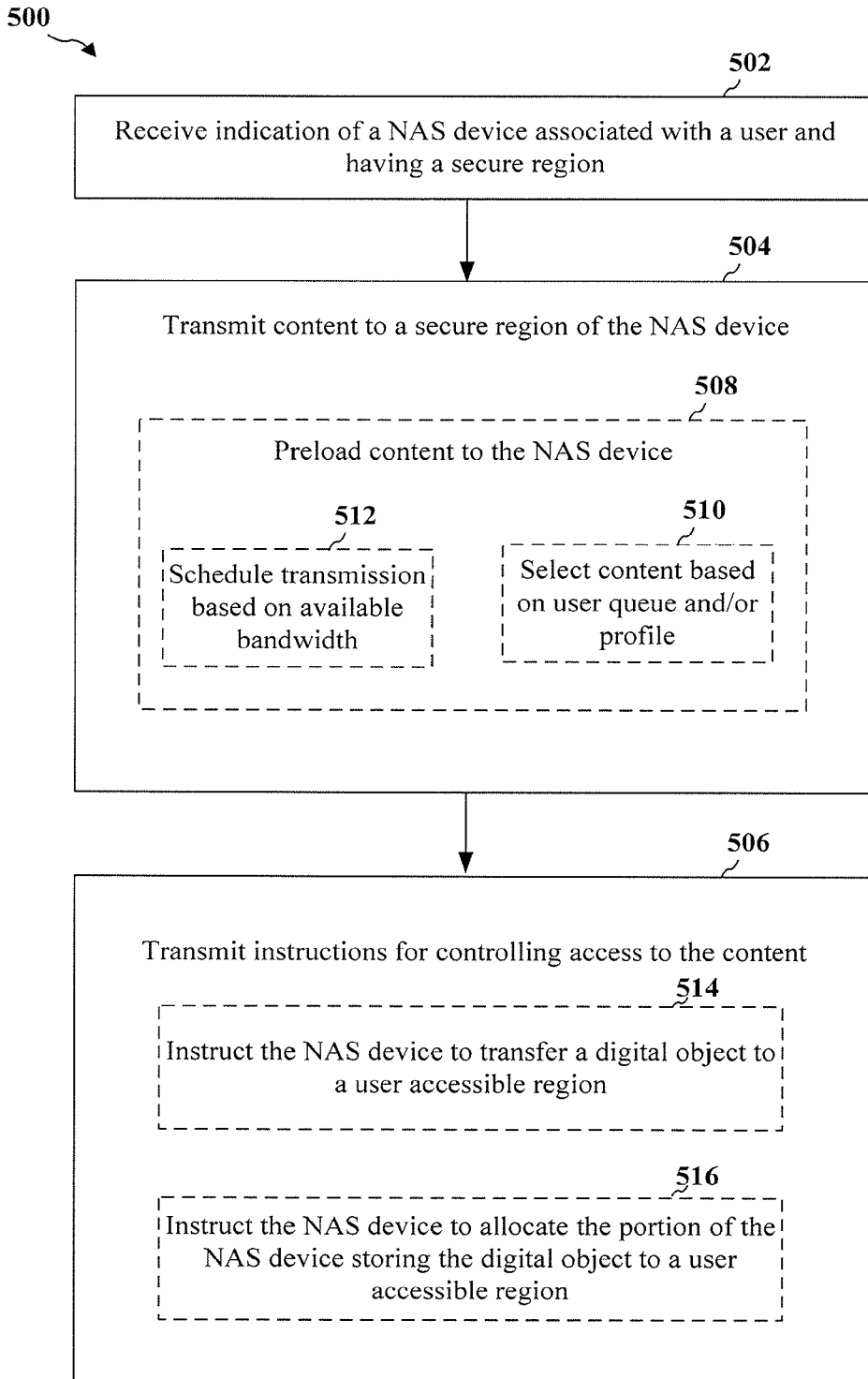
FIG. 5 is a flow diagram, illustrating aspects of a method of streaming content to a network attached storage device having a secure region.

FIG. 5 is a flow chart 500 of a computer assisted method of transmitting content to a secured buffer at a storage device for a remote local network. The method may be performed by a computer at a content provider, such as a stream content provider, for transmitting content to a secured buffer at a network attached storage device. For example, the content may be streamed from a stream content provider. The remote local network may be, for example a user's home network. At 502, the content provider receives an indication of an NAS device associated with a user and having a secure region. At 504, the content provider transmits content for viewing by the user to a secure region within the NAS device. The content may be transmitted in response to a request from a user for content, or may involve preloading content to the user's NAS device. At 506, the content provider transmits instructions to the NAS device to control the user's access to the content.

Figure 6:
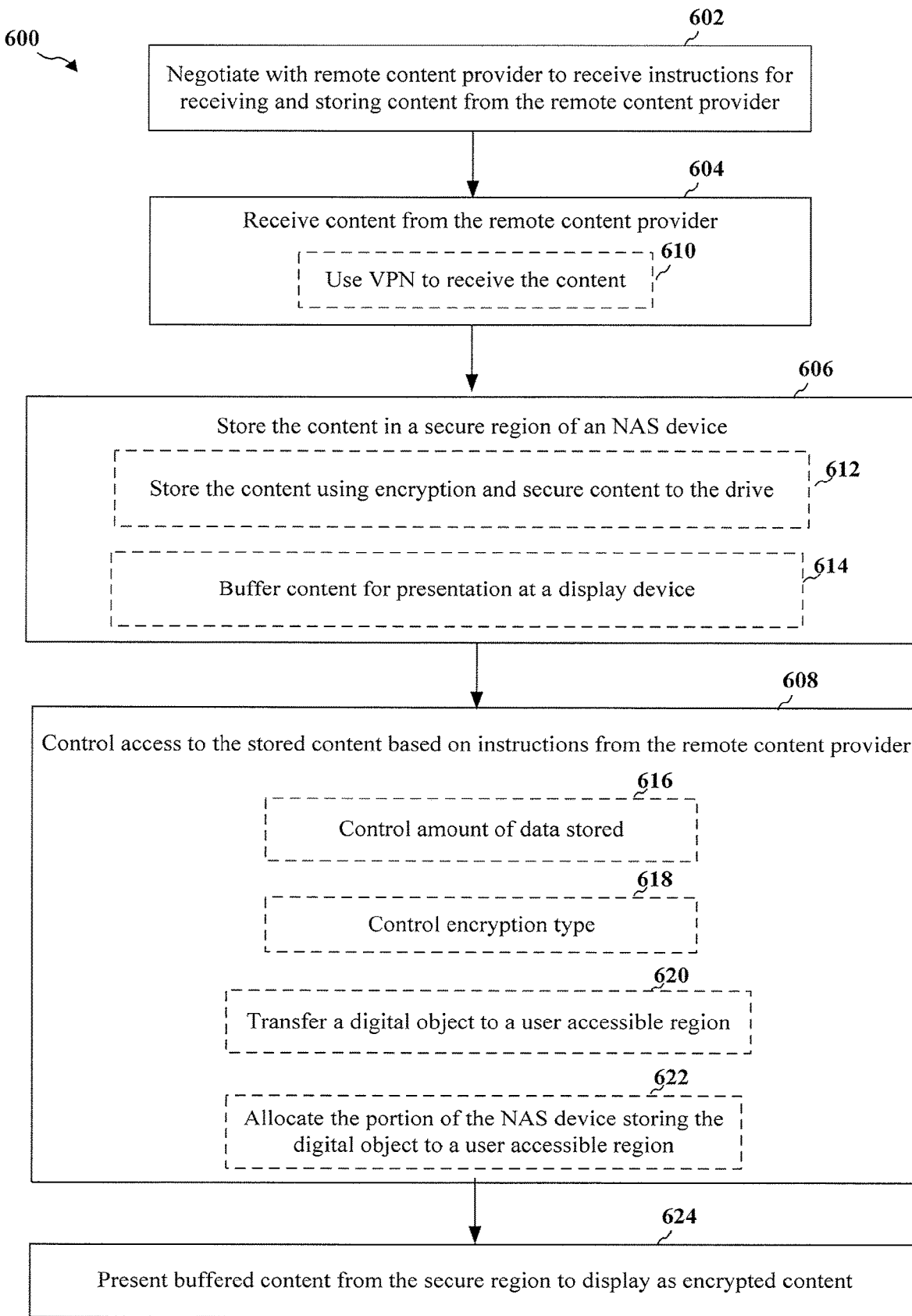
FIG. 6 is a flow diagram, illustrating aspects of a method of receiving streaming content at a network attached storage device having a secure region.

Transmitting the content may optionally include preloading the content to the NAS device, at 508. Preloading the content helps to ensure an enjoyable viewing experience by helping to prevent hic-ups or stalling, for example while a display waits for the next packet of streamed content to be received. Optional aspects are illustrated in FIGS. 5 and 6 as having a dashed line. The content may be selected based on a user queue list of desired content and/or a user profile, at 510. For example, the system can review your "to watch" queue and pre-download those to speed up watching. By pre-downloading (in whole or in part) content, very high definition (4K) movies that would otherwise be too large to realistically stream can be pre-stored on the NAS device.

Additionally, the system can be used to time-shift downloads to a time with more available bandwidth, e.g., during a time of reduced use in a home or neighborhood, when a shared line such as cable is used, in order to avoid congestion and video stuttering. For example, at 512, the transmission of preload content may be scheduled by selecting a transmission time based on bandwidth availability to transmit the content.

The transmission of instructions to the NAS device to control the user's access to the content at 506 may include controlling an amount of data stored at the secure region of the NAS device and/or controlling an encryption type used in the secure region of the NAS device. Although the NAS device may be configured to allow the content provider to control an amount of data stored in the secure region, there may be a limit to the amount of storage that can be used by the remote content provider. For example, the secure region may be limited to a predetermined amount of the storage of the NAS device. This limit on the secure region maintains a certain amount of storage for the user accessible region of the NAS device.

The secure region of the NAS device may be treated as a buffer for a display device attached to the NAS device via the remote local network.

At 514, the content provider may instruct the NAS device to transfer a digital object stored in the secure region to the user accessible region along with keys for accessing the digital object, as described in connection with FIGS. 4A and 4B.

Alternately, the content provider may instruct the NAS device to allocate to the user accessible region a portion of the secure region of the NAS device storing the digital object at 516.

FIG. 6 is a flow chart 600 of a computer assisted method of receiving, at an NAS device, receiving content from a remote content provider. The method may be performed by an NAS device having a user accessible region and a secure region. The NAS device may be configured to couple, for example, to a user's home network. At 602, the NAS device negotiates with the remote content provider to receive instructions for receiving and storing content from the remote content provider. Such negotiation may be made in response to a request for content from a connected display device in the user's home network. Such negotiation may also be initiated by the remote content provider after it has been informed of the presence of the NAS device. The remote content provider may, for example, receive an indication of the NAS device from a display device coupled to the NAS device, and/or may discover the presence of an NAS having secure storage in a different manner. An indication of the NAS device with secure storage may be transmitted from the display device in connection with a request for content from the display device.

At 604, the NAS device receives the digital content from the remote content provider. At 606, the NAS device stores the digital content in the secure region of the NAS device.

At 608, the NAS device controls access by the user to the digital content stored in the secure region based on instructions from the remote content provider. For example, the digital content stored in the secure region may be inaccessible by the user of the display device without permission from the remote content provider. The secure region of the NAS device may be, for example, hidden from the user.

As part of storing the digital content in the secure region at 606, the NAS device may store the digital content using encryption at 612, wherein the stored digital content is secured to the secure region of the NAS device. The type of encryption used may be controlled based on instructions from the remote content provider. A connection may be established at the NAS device with a display device, such that storing the content in the secure region comprises buffering the digital content for presentation to a user at the display device in a manner controlled by the stream content provider, as at 614.

At 616, an amount of data stored at the secure region of the NAS device may be controlled, e.g., based on instructions from the remote content provider. The amount of storage that can be controlled by the remote content provider may have an upper limit. At 618, an encryption type used to store the digital content in the secure region of the NAS device may be controlled based on instructions from the remote content provider.

Content stored in the secure region may be reassigned to the user accessible region.

In one example, at 620, the NAS device may move a digital object stored in the secure region of the NAS device to the user accessible region along with keys for accessing the digital object based on instructions from the remote content provider.

In another example, at 622, the NAS device may allocate, to the user accessible region, a portion of the secure region of the NAS device storing a digital object based on instructions from the remote content provider.

The NAS device may use virtual private network encryption at 610 to receive the streaming content from the stream content provider.

At 624, the NAS device may present the stored content from the secure region to a display device as encrypted content. This maintains protection of the content. The display device may include a decryption module that decodes the encrypted content as it is transmitted from the secure region of the NAS device to the display device.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Figure 7:
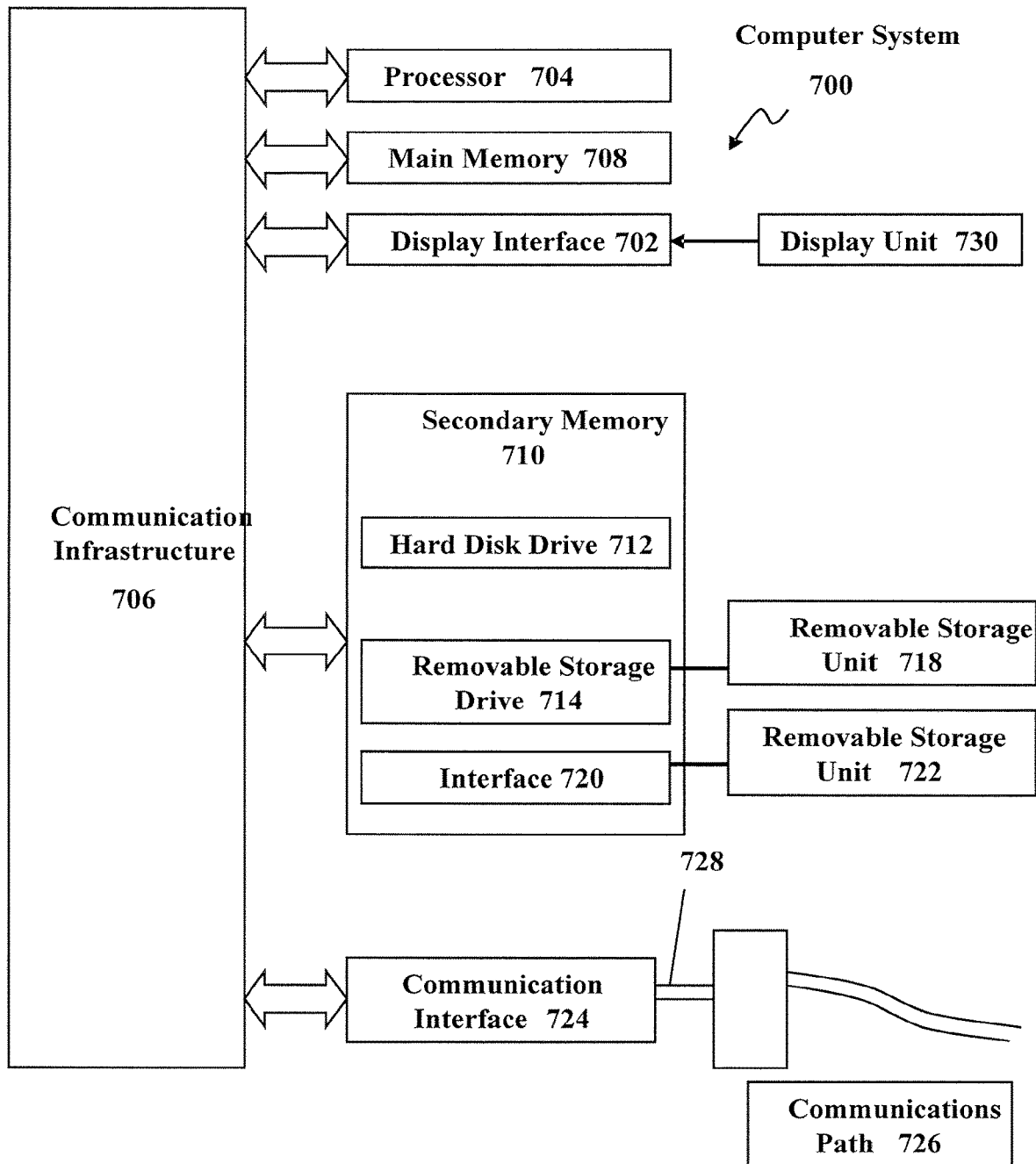
FIG. 7 is an example system diagram of various hardware components and other features for use in accordance with aspects presented herein.

FIG. 7 presents an example system diagram of various hardware components and other features, for use in accordance with aspects presented herein. Certain aspects may be implemented using software, hardware, or a combination thereof and may be implemented using one or more computer systems or other processing systems. One implementation may include one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software implementations are described in terms of this example computer system. After reading this description, it will become apparent to a person skilled in the relevant art(s) that other computer systems and/or architectures can be used to implement the VBT.

Computer system 700 can include a display interface 702 that forwards graphics, text, and other data from the communication infrastructure 706 (or from a frame buffer not shown) for display on a display unit 730. Computer system 700 also includes a main memory 708, preferably RAM, and may also include a secondary memory 710. The secondary memory 710 may include, for example, a hard disk drive 712 (or hybrid and/or solid state drives) and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative implementations, secondary memory 710 may include other similar devices for allowing computer programs or other instructions to be loaded into computer system 700. Such devices may include, for example, a removable storage unit 42722 and an interface 720. Examples of such may include a program cartridge and cartridge interface (such as that found in video game devices), a removable memory chip (such as an EPROM, or programmable read only memory (PROM)) and associated socket, and other removable storage units 42722 and interfaces 720, which allow software and data to be transferred from the removable storage unit 42722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Some embodiments presented herein may include such computer program products.

Computer programs (also referred to as computer control logic) are stored in main memory 708 and/or secondary memory 710. Computer programs may also be received via communications interface 724. Such computer programs, when executed, enable the computer system 700 to perform the features presented herein. In particular, the computer programs, when executed, enable the processor 704 to perform the features presented herein. Accordingly, such computer programs represent controllers of the computer system 700.

In an implementation using software, the software may be stored in a computer program product and loaded into computer system 700 using removable storage drive 714, hard drive 712, or communications interface 720. The control logic (software), when executed by the processor 704, causes the processor 704 to perform the functions described herein. Another implementation may primarily be implemented in hardware using, for example, hardware components, such as application specific integrated circuits (ASICs). Implementation of the hardware state machine so as to perform the functions described herein will be apparent to persons skilled in the relevant art(s).

In yet another implementation, certain aspects may be implemented using a combination of both hardware and software.

Figure 8:
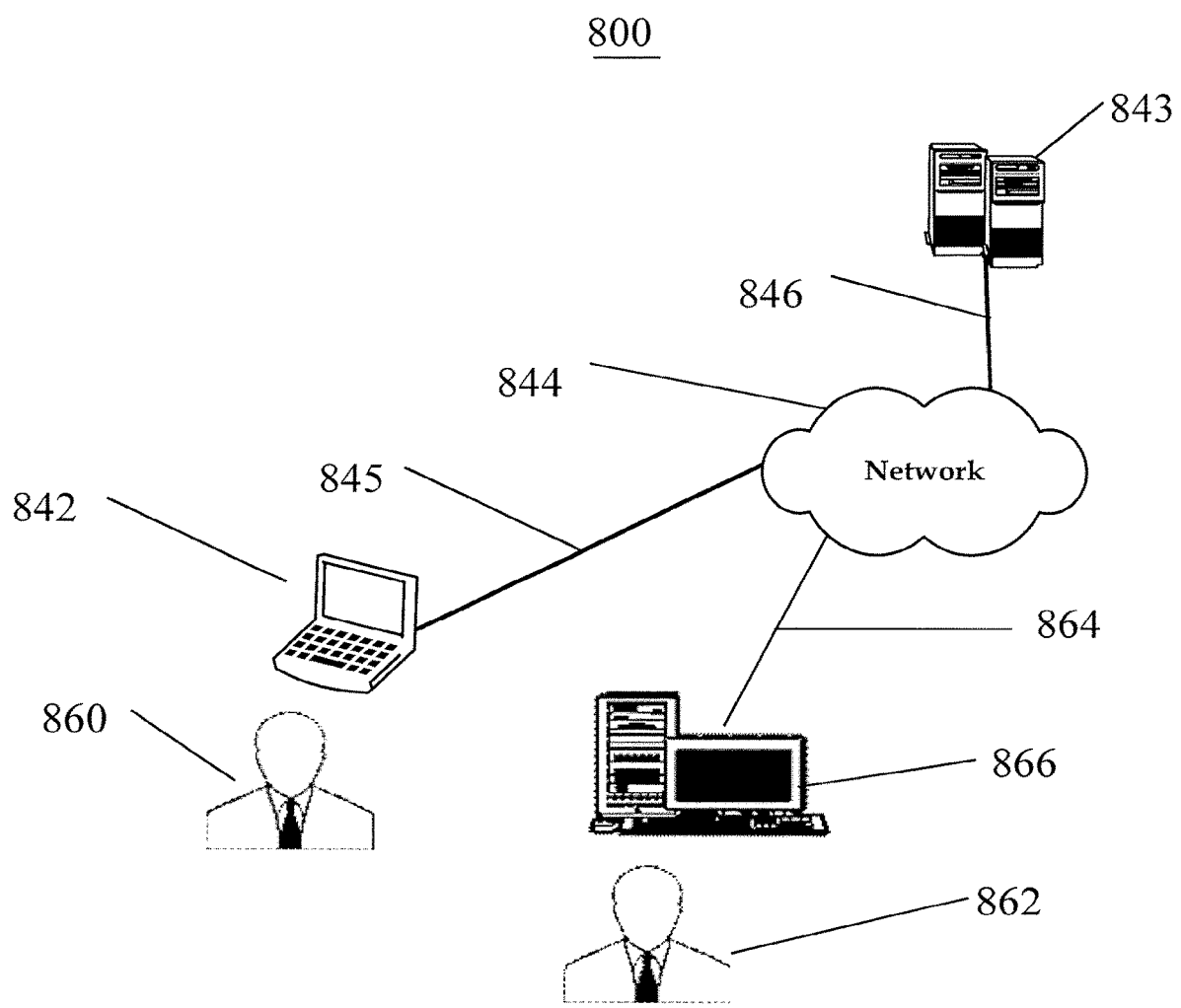
FIG. 8 is a diagram of various example system components, in accordance with aspects presented herein.

FIG. 8 is a block diagram of various example system components, in accordance with some embodiments presented herein. FIG. 8 shows a communication system 800 usable in accordance with the embodiments presented herein. The communication system 800 includes one or more accessors 860, 862 (also referred to interchangeably herein as one or more "users" or clients) and one or more terminals 842, 866. In an implementation, data for use in accordance with some embodiments may be, for example, input and/or accessed by accessors 860, 864 via terminals 842, 866, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, for example, a network 844, such as the Internet or an intranet, and couplings 845, 846, 864. The couplings 845, 846, 864 include, for example, wired, wireless, or fiber optic links.

The various exemplary embodiments are provided to enable one of ordinary skill in the art to practice various aspects of the present invention. Modifications to exemplary embodiments presented throughout this disclosure will be readily apparent to those skilled in the art, and the concepts disclosed herein may be extended to other devices. All structural and functional equivalents to the various components of the exemplary embodiments described throughout this disclosure that are known or later come to be known to those of ordinary skill in the art are expressly incorporated herein by reference.

What is claimed is:

1. A streaming device configured to be coupled to a local area network, the streaming device comprising:
a network interface circuitry configured to receive digital content from a remote content provider outside of the local area network; and
one or more processors configured to execute one or more sequences of instructions which, when executed by the one or more processors, cause performance of:
finding a storage device on the local area network with an available secure region for storing digital content;
sending connection information for the storage device to the remote content provider to enable establishing a secure storage buffer in the storage device by the remote content provider, the secure storage buffer configured to enable the remote content provider to pre-load digital content on the storage device;
requesting a first digital content from the remote content provider;
receiving an access key to a pre-loaded copy of the first digital content stored on the storage device on the local area network; and
obtaining the first digital content from the storage device using the access key.

2. The streaming device of claim 1, wherein the secure storage buffer is inaccessible by the streaming device without permission from the remote content provider.

3. The streaming device of claim 1, wherein the access key is provided by the remote content provider in response to a payment.

4. The streaming device of claim 1, further comprising a display.

5. The streaming device of claim 1, wherein the streaming device is a smart television.

6. The streaming device of claim 1, wherein the access key comprises a decryption key for the first digital content.

7. The streaming device of claim 6, wherein the one or more sequences of instructions further cause performance of decrypting the first digital content using the decryption key.

8. The streaming device of claim 1, further comprising a decryption module for decrypting encrypted digital content.

9. The streaming device of claim 1, wherein obtaining the first digital content from the storage device using the access key comprises:
streaming the first digital content from the secure storage buffer in the storage device.

10. A method for receiving digital content from a remote content provider on a streaming device, the method comprising:
finding a storage device with an available secure region for storing digital content, the storage device located on a local area network with the streaming device;
sending connection information for the storage device to the remote content provider to enable establishing a secure storage buffer in the storage device by the remote content provider, the secure storage buffer configured to enable the remote content provider to pre-load digital content on the storage device;
requesting a first digital content from the remote content provider;
receiving an access key to a pre-loaded copy of the first digital content stored on the storage device on the local area network; and
obtaining the first digital content from the storage device using the access key.

11. The method of claim 10, wherein the secure storage buffer is inaccessible by the streaming device without permission from the remote content provider.

12. The method of claim 10, wherein establishing the secure storage buffer in the storage device includes:
encrypting the first digital content; and
determining a decryption key.

13. The method of claim 10, wherein the access key is provided by the remote content provider in response to a payment.

14. The method of claim 10, wherein the streaming device is a smart television.

15. The method of claim 10, wherein the access key comprises a decryption key for the first digital content.

16. The method of claim 15, further comprising decrypting the first digital content using the decryption key.

17. The method of claim 10, wherein obtaining the first digital content from the storage device using the access key comprises:
streaming the first digital content from the secure storage buffer in the storage device.

18. A streaming device configured to be coupled to a local area network, the streaming device comprising:
means for receiving digital content from a remote content provider outside of the local area network;
means for decrypting encrypted digital content; and
a processor configured to:
find a storage device on the local area network with an available secure region for storing digital content;
send connection information for the storage device to the remote content provider to enable establishing a secure storage buffer in the storage device by the remote content provider, the secure storage buffer configured to enable the remote content provider to pre-load digital content on the storage device;
request a first digital content from the remote content provider;
receive an access key to a pre-loaded copy of the first digital content stored on the storage device on the local area network; and
obtain the first digital content from the storage device using the access key.

19. The streaming device of claim 18, wherein the secure storage buffer is inaccessible by the streaming device without permission from the remote content provider.

20. The streaming device of claim 18, wherein the means for decrypting encrypted digital content is configured to decrypt the first digital content using a decryption key provided by the remote content provider.

* * * * *